United States Patent [19]

Parra

[11] Patent Number: 4,837,633
[45] Date of Patent: Jun. 6, 1989

[54] ELECTRONIC BOUNDARY FRAMING DEVICE AND METHOD

[76] Inventor: Jorge M. Parra, 615 N. Blvd., New Port Richey, Fla. 34652

[21] Appl. No.: 162,937

[22] Filed: Mar. 1, 1988

Related U.S. Application Data

[63] Continuation-in-part of Ser. No. 64,418, Jun. 22, 1987.

[51] Int. Cl.$^4$ .......................... H04N 5/30; G03B 13/02
[52] U.S. Cl. ..................................... 358/224; 354/219; 354/289.1
[58] Field of Search ................ 358/224, 226; 354/219, 354/224, 225, 289.1; 340/747, 734

[56] References Cited

U.S. PATENT DOCUMENTS

| | | | |
|---|---|---|---|
| 2,488,541 | 11/1949 | Holme | 250/71 |
| 2,952,738 | 9/1960 | Akins | 358/224 |
| 2,969,594 | 1/1961 | Palmer | 33/47 |
| 3,678,590 | 7/1972 | Hayward | 356/247 |
| 3,682,552 | 8/1972 | Hartman | 356/3 |
| 4,200,380 | 4/1980 | Sato et al. | 354/219 |
| 4,244,651 | 1/1981 | Roof | 356/247 X |
| 4,432,014 | 2/1984 | Roos et al. | 358/224 |
| 4,527,201 | 7/1985 | Cappels | 358/224 |
| 4,622,641 | 11/1986 | Stephens | 340/731 |
| 4,660,092 | 4/1987 | Nutting | 358/224 |
| 4,710,762 | 12/1987 | Yamada | 340/721 |

FOREIGN PATENT DOCUMENTS

| | | | |
|---|---|---|---|
| 0042680 | 12/1981 | European Pat. Off. | 358/224 |
| 1332512 | 10/1973 | United Kingdom . | |
| 2154018 | 8/1985 | United Kingdom . | |

OTHER PUBLICATIONS

Scientific American, Sep. 1979, vol. 241, pp. 150-162, "Brain Mechanisms of Vision", Hubel et al.
Scientific American, Jun. 1982, pp. 124-134, "Brian Mechanisms of Visual Attention", Wurtz et al.
Visual Pattern Recognition, Dodwell, Holt, et al., 1970, Chap. 7, pp. 120-135.
"The Development of Visual Perception", Rosinski, Goodyear Publishing Co. 1977, pp. 31-36.

Primary Examiner—Jin F. Ng
Assistant Examiner—Stephen Brinich
Attorney, Agent, or Firm—Jim Zegeer

[57] ABSTRACT

An electronic view finder having an electronic display screen is provided with an electronic image source which produces an electronic image of a boundary frame and a neutral or black background with the electronic boundary frame being adjustable electronically in a predetermined manner when a binocular visioned viewer views the image of the electronic image with one eye and a scene with the other eye to produce an optically fused image of the scene and electronic image to the brain of the observer. When the electronic view finder is part of a video camera recording system which has a zoom lens, and a zoom lens control mechanism, the adjustment referred to electronically adjusts the boundary frame whereby the size of the bound frame is adjusted simultaneously or contemporaneously with the adjustment of the zoom lens. The image can be selectively presented either (1) the ordinary electronic video image of the scene being recorded or (2) the illuminated boundary frame.

12 Claims, 3 Drawing Sheets

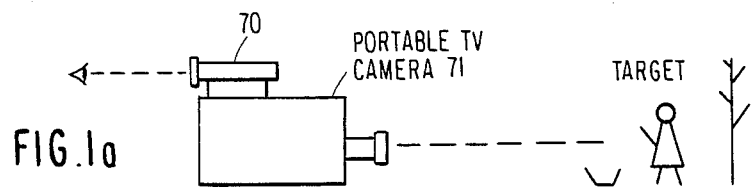
FIG. 1a
FIG. 1b
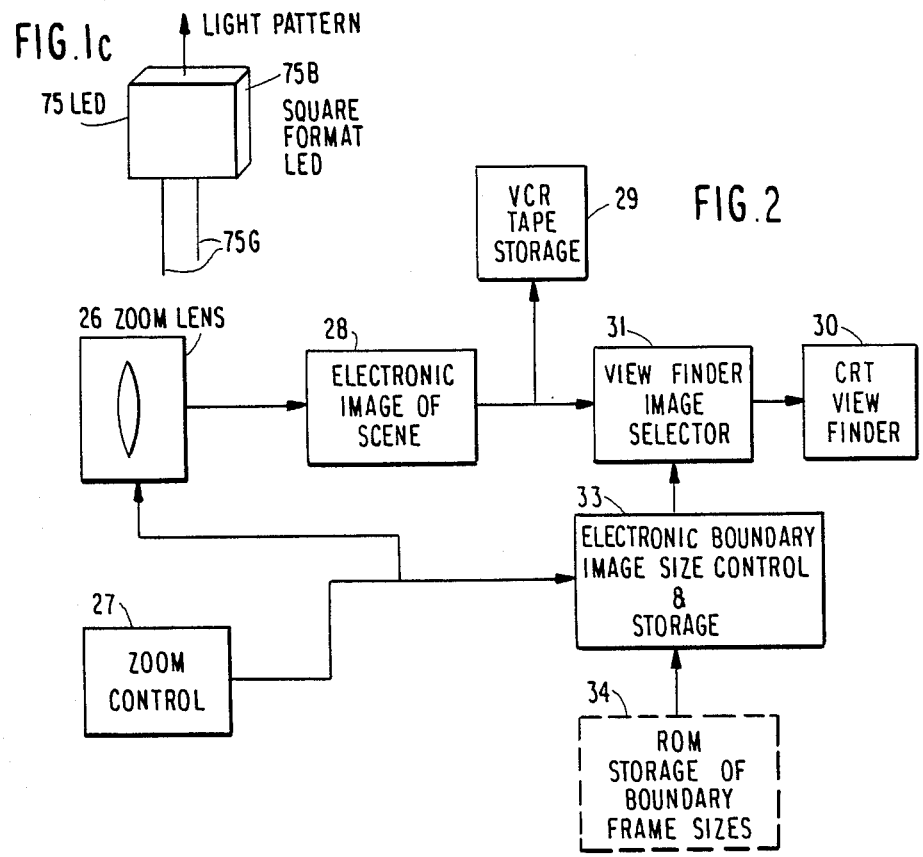

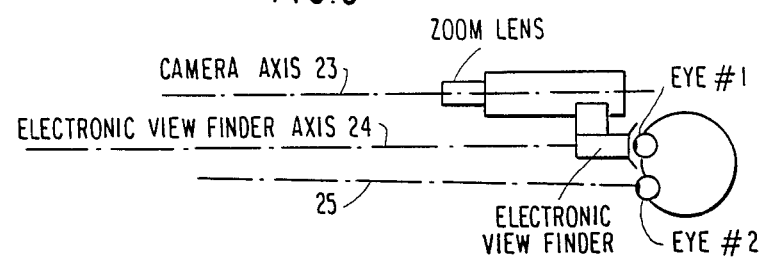
FIG.3
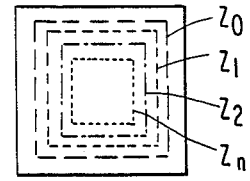
FIG.5
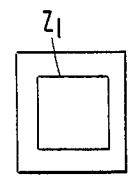 FIG.6a  FIG.6b 
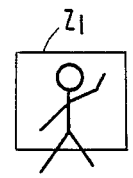 FIG.6c  FIG.6d 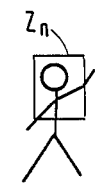

ELECTRONIC BOUNDARY FRAMING DEVICE AND METHOD

REFERENCE TO RELATED APPLICATIONS

This application is a continuation-in-part of application Ser. No. 064,418 filed June 22, 1987.

BACKGROUND OF THE INVENTION

The object of the present invention is to provide improvements in optic arrangements for binocular visioned people which is useful particularly for video cameras and other devices in which an electronic view finder imaging system is provided. The present invention depends on the phenomena of the human brain which uses images viewed by one eye with images viewed by the other eye to superpose an optically produced boundary frame image upon the image of a scene viewed through the other eye. The boundary image in a preferred embodiment is surrounded by an optical void as a black or nonvisible background of neutral background immediately surrounding the light forming the boundary frame. The boundary setting device for binocular visioned persona according to this invention includes a low level light source in a predetermined geometric pattern such as rectangular or circular which, in the preferred embodiment, is an electronic image produced on a cathode ray tube (CRT), or a back lighted liquid crystal display device. When the boundary geometric pattern from the low level light source is viewed through one eye of the observer and a scene containing a section to be encompassed within the boundary is viewed by the other eye of the observer, an optically fused image is presented to the observer with the light source means having the predetermined configuration bounding the section being encompassed in the scene.

When the video camera has a zoom lens attached, and a zoom lens control circuit, the boundary frame is adjusted contemporaneously to encompass a smaller or larger portion of the scene as presented to the human observer. In other words, when the boundary frame is rectangularly shaped, the frame actually reduces or increases in size since the eye of the observer which is viewing the scene unaided, does not see any enlargement or reduction in image, the frame therefore is increased in size or reduced in size to encompass smaller or larger portion of the actual image which is presented to the brain of the observer.

Thus, the invention provides an apparatus and method of presenting to the video camera operator, and typically a home video camera operator, the scene as fully viewed through one eye and a boundary setting device which is oriented with the camera and viewed through the other eye. Thus, when one eye is positioned on the electronic view finder and viewing the boundary frame which is an artificial light established in the view finder electronic CRT, the operator can get a significantly better perspective and feel for what he is including or not including in his video filming. Furthermore, by adjusting the size of the boundary frame according to and contemporaneous with adjustments in the zoom lens, the camera operator is provided with a boundary frame that is adjusted in size against an enlarged field of vision. Moreover, a switch is provided so that the electronic view finder can be operated in the normal fashion and the boundary setting device of this invention disabled, thus providing the user with a low cost alternative view finder system.

BRIEF DESCRIPTION OF THE DRAWINGS

The above and other objects, advantages and features of the invention will become more clear when considered with the following specification and accompanying drawings wherein:

FIGS. 1a, 1b and 1c correspond to FIGS. 8a, 8b and 8c of my application Ser. No. 064,418, FIG. 2 is a block diagram of a electronic view finder system applied to a video camera having a zoom lens and a zoom lens control.

FIGS. 3 and 3a–3b are a top plan view of a video camera having an electronic view finder attached, FIG. 5 illustrates the scene viewed through the electronic view finder with various adjustments with the zoom lens $Z_1, Z_2 \ldots Z_n$ depicted, and FIG. 6a illustrates the boundary image presented to eye No. 1, FIG. 6b illustrates the full field of vision of the observer in eye No. 2, FIG. 6c presents the fused image presented to the observer in FIG. 3, and FIG. 6d illustrates a change to a smaller boundary frame $Z_n$ in the fused image.

DETAILED DESCRIPTION OF THE INVENTION

FIGS. 1a, 1b and 1c correspond to FIGS. 8a, 8b and 8c of my application Ser. No. 064,418 entitled "Boundary Setting Device". A plurality of light sources 75-1, 75-2 ... 75-N of predetermined shape are arrayed in a desired framing pattern (square, but circular, rectangular or other geometrical boundary shape may be used) and surrounded by an optical void 76 in tube 70 and mounted on a portable TV camera 71. When eye No. 1 of the observer views the array of light sources and optical void 76 (FIG. 1a), and eye No. 2 views the full scene (FIG. 1b middle), a fused image is presented to the observer with the light elements 75-1, 75-2 ... 75-N framing or setting the boundary of the image to be captured on tape or film. The individual light sources may be light emitting diodes 75LED shown in FIG. 1c in which a bar of light 75B is emitted when the leads 75C are energized.

Figure 4A:
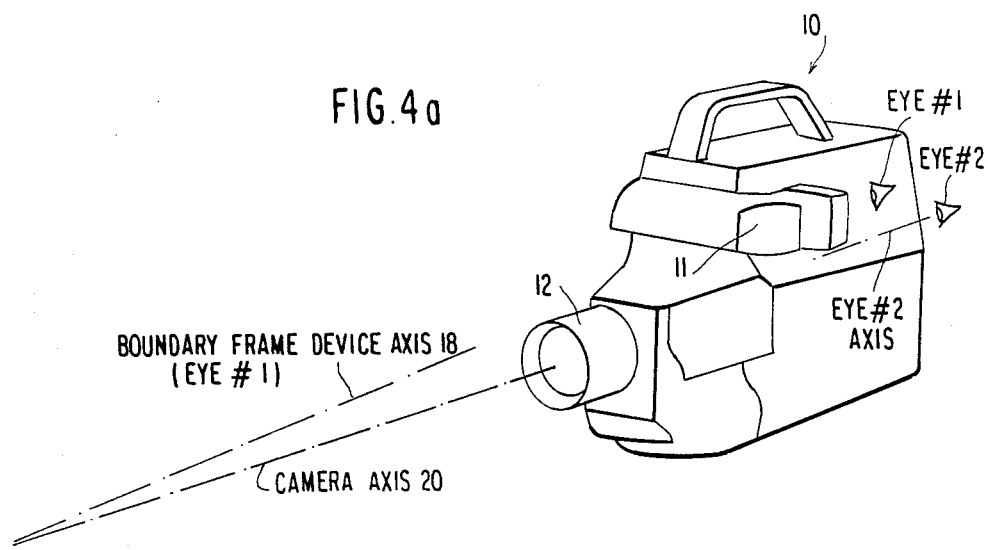
FIGS. 4a and 4b illustrate typical camera arrangements for electronic view finder positions.
Figure 4B:
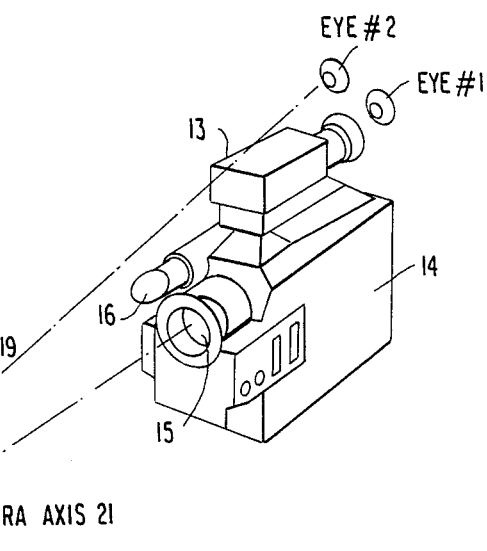

Referring now to FIGS. 4a and 4b, typical commercial video or television cameras sold for the home or commercial user are illustrated, FIG. 4a being a typical home video camera from Panasonic (Matsushita) wherein the electronic view finder 11 is positioned on the right side of the camera for viewing by the right eye (eye No. 1) of an observer but it could just as easily be switched or positioned on the left side for viewing through the left eye by the observer. The camera has a telephoto or zoom lens 12 and a zoom lens control system (shown in FIG. 2). A similar system is shown in FIG. 4b which is a Sony Corporation type home video or commercial camera. In this case, the electronic view finder 13 is positioned on the top of camera 14 and a zoom lens or telephoto lens system 15 is provided with a similar control system. Audio systems such as a microphone 16 are likewise provided and form no part of the present invention. In either case, eye No. 1 is the eye viewing through the electronic view finder and eye No. 2 is the eye viewing the scene. (In FIG. 4a, eye No. 1, the right eye of the observer, is viewing the boundary framing device through the electronic view finder and in FIG. 4b, the left eye is designated as eye No. 1 and is viewing the image or boundary framing image set up in electronic view finder.) Both view finders 11 and 13 are oriented with the viewing camera so that when eye No. 1 is properly viewing the boundary frame in the electronic viewing device, his head is generally aligned along the axis of the electronic view finders 11 and 13. The electronic view finders are oriented with the axis of the camera 20 and 21, respectively. As shown in FIG. 3, the axis of the camera is designated as 23 and the axis of the electronic view finder is designated as 24 and the axis of the eye No. 2 is designated as 25. These are all oriented towards a common scene.

Referring now to FIG. 2, the camera's zoom lens 26 (which may be either lens 12 or 15 of the camera shown in FIGS. 4a and 4b, respectively) is adjusted by a zoom lens control circuit 27 which adjusts the magnification by the zoom lens upon the electronic imaging portion of the video camera 28 which is designated as electronic image of scene. This may be a typical solid state electronic imaging device CCD such as used in conventional video recorders or cam-corders to produce on the output thereof an electronic image (digital or analog) to be recorded on a video cassette recorder tape storage device 29. At the same time, the electronic image is typically presented to a CRT or cathode ray tube or liquid crystal view finder or other electronic display screen 30. However, according to the present invention, a view finder image selector 31 is an electronic switch for selecting either the electronic image of scene for presentation to the observer in CRT viewing device view finder 30 in the normal fashion or an electronically generated boundary image according to the present invention. The view finder image selector 32 is an electronic switch switchable between the image presented by the electronic boundary image size control and storage device 33 or the usual electronic image from the video imaging device or CCD 28. According to this invention, the electronic boundary image size control and storage may be an electronic storage device such as a read-only memory (ROM) 34 similar to those used for storing data and generating images corresponding to the date and time are stored in a conventional video camera, except in the present case, the image stored and generated is a boundary framing image which may be increased or decreased in size in accordance with adjustments in the zoom control 27. Thus, whenever a control signal issues from zoom control 27 to adjust zoom lens 26, a signal is also applied to boundary image size control and storage 33 to select a boundary image size from a storage (typically a read only memory ROM but which may be a computer program for producing an image adjustable in size according to the zoom control signal) to be supplied to the CRT view finder 30 via the view finder image selector switch 32. As shown in FIG. 5, the size of the boundary frame image can vary from a size $Z_o$ down to a small size $Z_n$ and in various different size in between.

As shown in FIG. 6a, 6b, 6c and 6d, the boundary frame image presented in the CRT view finder 30 is viewed by eye No. 1 (FIG. 6a) while, at the same time, a scene is viewed by eye No. 2 (FIG. 6b). If the boundary frame viewed by eye No. 1 is of a size $Z1$ initially, which would frame most of the individual shown in FIG. 6b as viewed by eye No. 2, the composite or fused image of FIG. 6c illustrates the fused image with boundary frame $Z1$ and the same individual in the scene of FIG. 6b. When the zoom control 27 is operated to enlarge, for example, the image, the electronic image of the scene, a reduced size frame $Z_n$ is presented to the eye No. 1 viewing the electronic view finder 30. This smaller boundary frame $Z_n$ is fused with the image viewed by eye No. 2 (the image, however, remains of the same size as viewed by eye No. 2).

The view presented by the electronic view finder 30 is preferably a black CRT screen (see FIG. 5) with the illuminated boundary frame $Z_o$, $Z_l$. . . $Z_n$ being a low light level image which the brain fuses with the image produced by the other eye.

While the invention has been shown and described in relation to the preferred embodiments, it will be appreciated that various modifications and adaptations of the invention will be readily apparent to those skilled in the art and it is intended to encompass such modifications and adaptations within the spirit and scope of the claims appended hereto.

What is claimed is:

1. In an electronic view finder having an electronic display screen, means for producing an electronic image and means for causing said electronic image to cause a visual display on said display screen, the improvement wherein said electronic image is a boundary frame and a neutral background and means for electronically adjusting said boundary frame in a predetermined manner, whereby when a binocular visioned observer views the image of said electronic image with one eye and a scene with the other eye, an optically fused range of said scene and electronic image is presented to the brain of said observer.

2. The electronic view finder defined in claim 1 wherein said electronic view finder is a part of a video camera recording system including a zoom lens and a zoom lens control means, and said means for electronically adjusting said boundary frame includes said zoom lens control means whereby the size of said boundary frame is adjusted contemporaneously with adjustments of said zoom lens.

3. The electronic view finder defined in claim 2 including image select switch means for selectively displaying on said electronic display screen (1) said electronic image of a boundary frame and a neutral background or (2) the scene being observed by said video camera.

4. The electronic view finder defined in claim 2 wherein said boundary frame is reduced in size as said zoom lens control means optically enlarges and said video camera records a portion of the scene viewed by said other eye.

5. In a method of presenting a framed image in the electronic image view finder of a video camera, the improvement wherein an electronic boundary frame light image is presented to one eye of a binocular visioned observer viewing said electronic image view finder and the other eye of said observer views the scene to be recorded by said camera, whereby an optically fused image of the respective scenes viewed through the two eyes of said binocular visioned observer is presented to the brain of said binocular visioned observer.

6. The method defined in claim 5 wherein said camera has a zoom lens and a zoom lens control device and the area encompassed by said boundary frame light image is changed synchronously with changes in said zoom lens by said zoom lens control device.

7. A boundary setting device for a camera comprising:

an electronic display screen means and means for causing a visual image of an adjustable boundary frame for defining the viewfield of a camera on an optically neutral background to be presented on said electronic display screen means.

8. The boundary setting device defined in claim 7 including a camera having a predetermined optical axis and means for mounting said boundary setting device on said camera so that said adjustable boundary frame surrounds a scene to be photographed by said camera.

9. The boundary setting device defined in claim 7 including a video camera, a zoom lens on said video camera, and means for causing contemporaneous operation of said means for causing a visual image of an adjustable boundary frame with operation of said zoom lens.

10. The invention defined in claim 7 wherein said optically neutral background is constituted by a black background.

11. The invention defined in claim 9 wherein said optically neutral background is an electronically formed on said electronic display.

12. The invention defined in claim 9 including selection switch means for selectively displaying on said electronic display (1) said visual image of an adjustable boundary frame on an optically neutral background or (2) the scene being observed by said video camera.

* * * * *